United States Patent [19]
Kinney

[11] 3,795,054
[45] Mar. 5, 1974

[54] METHOD AND APPARATUS FOR CALIBRATING THE POSITION OF A TOOL AND FOR GAUGING THE DIMENSION OF A WORKPIECE

[75] Inventor: John M. Kinney, Cortland, Ohio

[73] Assignee: The American Welding & Manufacturing Company, Warren, Ohio

[22] Filed: Sept. 21, 1971

[21] Appl. No.: 182,504

Related U.S. Application Data

[60] Division of Ser. No. 63,620, Aug. 13, 1970, Pat. No. 3,641,849, which is a continuation-in-part of Ser. No. 776,389, Nov. 18, 1968, abandoned.

[52] U.S. Cl. ............................ 33/174 PC, 33/174 L
[51] Int. Cl. ......................... G05b 19/18, G01b 7/02
[58] Field of Search .......... 82/1 R, 2 B, 21 B, 34 A; 90/13 R, 13.9; 318/572; 33/174 PC, 174 L, 125 R

[56] References Cited
UNITED STATES PATENTS

2,554,171   5/1951   Brunot et al. ...................... 33/125 R
3,605,909   9/1971   Lemelson ........................ 33/174 PC

OTHER PUBLICATIONS

Stocker; William M., "Tape-Controlled 'Inspector' Measures in Six Axes," American Machinist, 2–9–59, pp. 101–103.

Primary Examiner—Robert B. Hull
Assistant Examiner—Richard R. Stearns
Attorney, Agent, or Firm—Watts, Hoffman, Fisher & Heinke Co.

[57] ABSTRACT

In a machine tool, a calibration and gauging system comprising drive means for moving a tool or inspection probe to a commanded position which is beyond a calibration position. The calibration and gauging system also includes circuitry for developing a transfer signal when the tool or inspection probe has arrived at the commanded position and a "false" transfer signal when the tool or probe has arrived at the calibration position. The transfer signals initiate the next sequence of the machine tool program.

8 Claims, 8 Drawing Figures

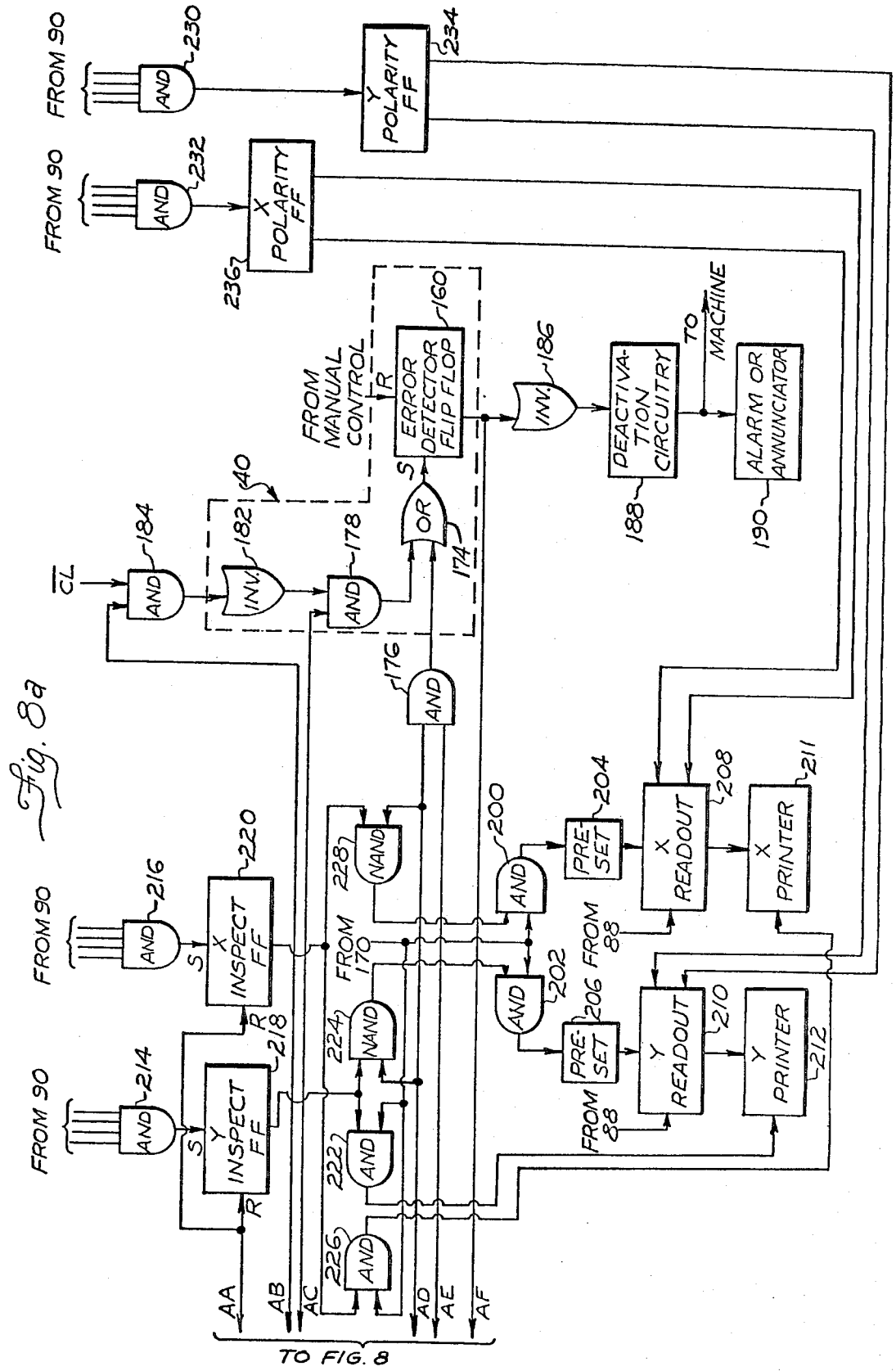

3,795,054

METHOD AND APPARATUS FOR CALIBRATING THE POSITION OF A TOOL AND FOR GAUGING THE DIMENSION OF A WORKPIECE

BACKGROUND OF THE INVENTION

This is a division, of U.S. Pat. application Ser. No. 63,620, filed Aug. 13, 1970, which is now U.S. Pat. No. 3,641,849, and which was a Continuation-in-part of U.S. Pat. application Ser. No. 776,389, entitled, "Method and Apparatus Including a Gauge for Positioning a Numerically Controlled Machine" and which is now abandoned.

This invention relates to machine tools, and more particularly, to a method and apparatus for accurately positioning a tool or an inspection probe with respect to a calibration position in order to eliminate machining and inspection errors due to tool or inspection probe wear, incorrect dimensions of the tool or probe, misalignment of the tool or probe, etcetera.

The operation of numerically controlled machine tools is now a well-known operation and extensively utilized in the field of machining. Briefly, this operation comprises moving a tool or a workpiece in accordance with numerically programmed instructions. The instructions determine the path of travel of the tool, which may be linear or circular. Signals indicative of the position of the tool at any given time are compared with signals derived from the programmed instructions that determine the path of the tool, and the tool continues moving until the two signals are alike. When the two signals are alike, indicating that the tool has arrived at a commanded position, a transfer signal is provided to indicate that the tool is ready to execute a new command. Normally, the commands are supplied as signals that indicate a position to which the tool is to move, and a signal that indicates the rate of speed at which the tool is to move to that new position. For a description of the fundamentals of numerical control, reference may be had to a publication entitled, "Numerical Control," by R. M. Dyke, Prentice-Hall, Inc., 1967.

In present day applications it is often necessary to machine a large part with extremely small dimensional tolerances. For example, in one application it is necessary to contour the outer surface of a ring 36 inches in diameter to various dimensions that must be accurate to within ±0.001 inches. Such a part may be a component of a jet engine where extreme accuracy in machining is vital. Heretofore, this has been a time-consuming operation, because after each cut made by the tool the workpiece had to be dimensionally gauged. An initial dimensional gauging operation was required after the first cut in order to correct for incorrect dimensions of the tool, misalignment of the tool in its mounting or the like. Gauging was necessary after subsequent cuts in order to correct for wear of the tool. When any of these errors were detected by manually measuring the dimensions of the workpiece, the commands or instructions to the tool were varied from the prepared program by amounts sufficient to compensate for the errors. This is time-consuming, inasmuch as it requires stopping the machine tool and having an operator perform the gauging operation, determine the amount of offset or correction that must be provided to correct the program, and set that correction factor into the control system. Not only has this process been time-consuming, but it provides opportunity for human error in setting the correct offset to the computer. It has been found from experience that numerous expensive workpieces must be scrapped because of that human error.

Hereinafter, for the sake of clearness of description, reference will be made to a machine tool in which an operating tool moves relative to a workpiece. It is understood, however, that the invention is equally applicable to a machine tool in which the operating tool is fixed in position and the workpiece is moved relative to the operating tool.

Accordingly, it is a general object of the present invention to provide a method and apparatus whereby the operative or functional edge of a tool may be accurately positioned with respect to a calibration position in order to eliminate machine errors due to the foregoing reasons, and consequently to eliminate the needs for manually gauging the dimensions of a workpiece during the machining process and for manually inspecting and dimensionally gauging the workpiece after machining is completed.

Some gauging of critical parts after the machining is still frequently required, therefore it is another object of the present invention to provide a method and apparatus for accurately gauging the dimension of the workpiece.

SUMMARY OF THE INVENTION

In certain types of numerically-controlled machine tools, a signal is provided which causes the tool to move from a starting position by a certain number of units of distance and at a certain rate of speed. When the tool has arrived at a predetermined position, a transfer signal is provided to the control circuitry indicating that the tool has executed the command and is ready to execute a new command. The control circuitry then commands the tool to move by a certain amount necessary in a direction or directions to attain a new position. The initial commands are based on the assumption that the tool length and the radius of the edge are as specified by the manufacturer, and that the tool is properly aligned in its mounting. As was pointed out, this is not necessarily correct.

According to the present invention, a calibration block is provided that has surfaces which are parallel to the X and Y movement coordinates of the machine. The positions of these surfaces in the X and Y coordinates are very accurately known. The machine is commanded by a program to bring the tool into a position adjacent to one of these surfaces. For example, assume that the tool is commanded to move along an X or horizontal axis until it is directly over the upper surface of the block that is parallel to the X axis. It is then commanded to move downwardly along the Y axis to a position at which, if attained, the tool would travel through the X or horizontal surface of the block, i.e., to a position which would be within the calibration block. When the operative or functional edge of the tool comes into contact with the upper surface of the calibration block, a false transfer signal is generated and sent back to the control circuitry. This signal indicates that the tool has reached the commanded position. At the instant this signal is developed, motion of the tool is stopped, and the program commands the tool to move upwardly again and out of contact with the block.

Inasmuch as the position of the surface of the block that has been contacted by the operative or functional edge of the tool is accurately known, the position of the operative or functional edge of the tool at the instant when it contacts the block is accurately known. Therefore, the program will control future positions of the actual edge of the tool, rather than the theoretical edge of the tool referenced to that calibration point in the direction of the Y axis. The operation can be repeated for calibrating the position of the member along the X axis using a surface of the calibration block that is parallel to the Y axis.

The positionable member need not necessarily be a cutting tool, but may be a probe or the like used in dimensionally gauging workpieces that have been partially or completely machined.

For example, when the method and apparatus of the invention are used for gauging dimensions of a workpiece, the operating tool comprises a probe having a non-cutting tip for contacting a workpiece to be gauged. The position of the contacting portion of the probe is first determined by calibration with respect to a calibration block as previously described. When the probe is calibrated, a counter is preset to the position of the surface of the calibration block contacted. The probe is then commanded to travel beyond the surface of the workpiece to be gauged, i.e., to a position which would be within the workpiece. When the probe contacts the surface of the workpiece, a readout device presents a visual display of the exact position of the probe and the probe is commanded to move to another inspection position.

In the foregoing manner, all machining errors in a machine tool application due to wear of the edge of the tool, misalignment of the tool, incorrect length of the tool, etc. are automatically eliminated. Also, less precise and hence less expensive tools may be used without introducing machining errors, and the number of different tools required for a job may be reduced. The calibrating operation may be performed as many times in the course of machining a workpiece as is deemed necessary.

In the case of a simple machining operation, calibrating may be necessary only once or twice during a complete machining operation. This may also be the case if relatively large dimensional tolerances are permissible. On the other hand, if the part being machined has an intricate contour and many cuts are involved, or if the permissive dimensional tolerances are extremely small, the tool may be calibrated after each cut. The calibrating process takes only a matter of seconds, which time is in no way comparable to the time necessary for an operator to manually gauge the dimensions of the part being machined and adjust the computer to compensate for dimensional variations.

Also, by utilizing the present invention, it is possible to accurately gauge the dimensions of a workpiece with an inspection probe which is automatically calibrated in the same manner as the tool, and which automatically travels to and gauges the dimensions of a workpiece.

BRIEF DESCRIPTION OF THE DRAWINGS

FIGS. 8 and 8a are logic diagrams of the circuitry of the preferred embodiment and the electrical connections between this circuitry and the circuitry shown in other figures.

DESCRIPTION OF A PREFERRED EMBODIMENT

The invention will be described in connection with a numerically controlled vertical turret lathe. However, it is to be understood that the application of the invention is not limited to any particular class of machine tool. It is applicable to any numerically controlled machine tool where a calibration position of a movable tool or an inspection probe must be accurately determined in order to re-position that element in successive steps with extreme accuracy using the calibration position as a reference.

Figure 1:
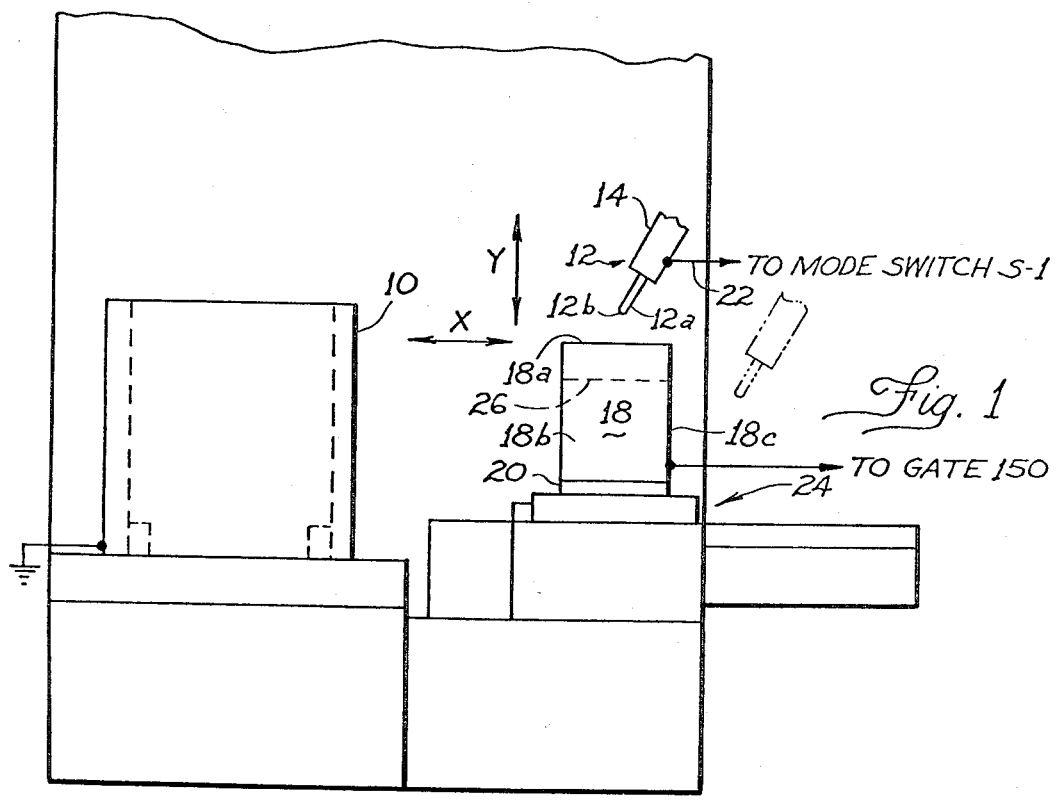
FIG. 1 is a plan view and electrical schematic diagram illustrating a portion of a preferred embodiment of the present invention in conjunction with a conventional machine tool.

FIG. 1 illustrates a vertical turret lathe in which a ring 10 is mounted for machining by a tool or inspection probe 12. The tool is conventionally mounted in a holder 14. The tool 12 is adapted to be moved under numerical control vertically along a Y axis and horizontally along an X axis. As is apparent, the operating tool may also move in other directions that are combinations of movements in the X and Y directions.

The term "operating tool" will be utilized hereinafter in the specification to include a tool, such as a cutting tool, or an inspection probe.

The dimensions of the tool 12 are provided by the manufacture and include the length of the tool to a center 12a of radius of curvature of its edge 12b and the radius of the edge. If these dimensions are accurate and the tool is properly mounted, the exact position of the tool edge can be determined. However, if the stated dimensions are incorrect, if the tool is improperly mounted, or if the specified radius has changed because of tool wear, improper positioning of the tool will result. Once the tool has been used, the only position that is known mathematically is that of the center 12a of the radius of curvature of the tool edge. This has lead to the time consuming dimensional gauging operations previously discussed.

The invention contemplates the provision of a calibration block 18 having a horizontal upper surface 18a, and vertical side surfaces 18b, 18c. The calibration block 18 is precisely dimensioned and positioned so that the position of its upper surface 18a is precisely known in the Y-direction, and the positions of its side surfaces 18b, 18c are precisely known in the X-direction. The block 18 is made of a conductive material or has a conductive coating thereon and is insulated from the remainder of the machine by an insulating material 20. The block 18 is connected to control circuitry to be later described by means of a lead marked "To Gate 150".

The block 18 may be either movable or fixed in position. As shown, it is mounted on a slide 24 so that it may be moved out of the way of the tool when the block is not in use.

In practicing the calibration method of the invention, the tool 12 may be commanded to move to the position as shown with its edge 12b above the surface 18a. It is then commanded to move downwardly in the Y-direction toward a level, such as is indicated at 26, which is located within the block 18. When the edge 12b of the tool 12 contacts the surface 18a, an electrical signal is sent to the control circuitry over the lead 22. Because the block 18 is precisely dimensioned and positioned, the exact position of the edge of the tool in the Y-coordinate is known at the time the signal is sent over the lead 22. The tool is then retracted to the original position as shown in FIG. 1. It may then be moved to the right downwardly in the Y-direction to the position shown in broken lines in the figure. It would then be commanded to move to the left in the X-direction until the edge 12b of the tool touches the side 18c of the block 18. At that time, another transfer signal is sent over the lead 22 which serves to accurately locate the edge of the tool in the X-coordinate.

After the tool has been positioned as described, it is ready to execute its programmed instructions. The calibrating process may be repeated as often as the complexity of the machine operation requires. If the part being machined has a relatively simple contour and hence requires few machine cuts, or inspections, it may be sufficient to calibrate the tool only before starting the machining or inspecting operation. On the other hand, if the part being machined has a relatively complex contour requiring many operations, it may be desirable to calibrate the tool after each cut or inspection. This matter is entirely under the control of the programmer who programs the calibrating operations into the machine program.

Figure 2:
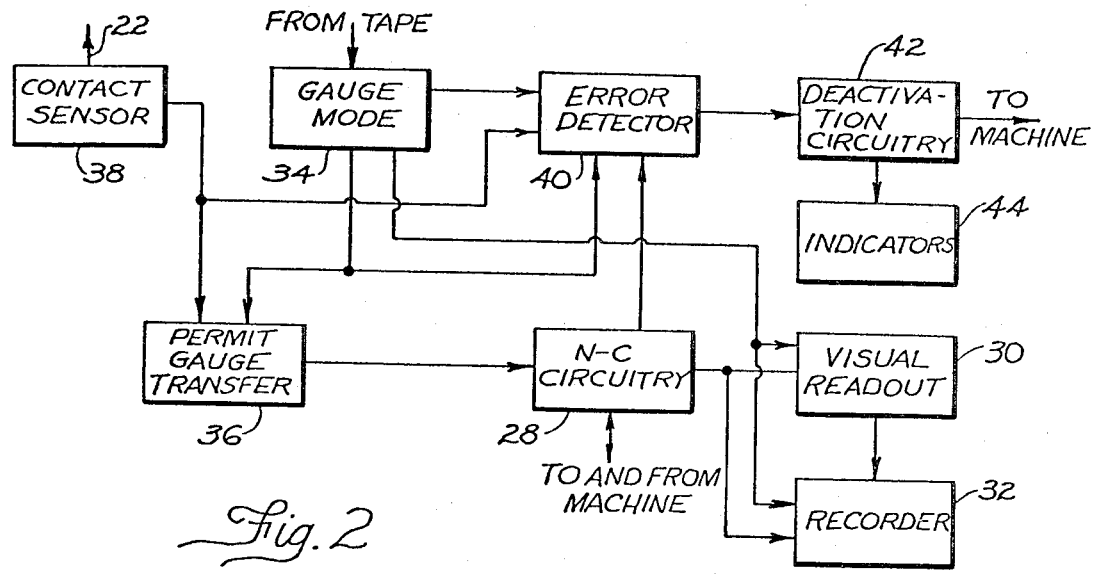
FIG. 2 is a much simplified block diagram illustrating the preferred embodiment of the present invention in conjunction with a machine tool.

FIG. 2 is a simplified block diagram illustrating the circuitry of the invention applied to a conventional numerically controlled machine. The conventional numerical control circuitry of the machine, which will be later described in detail, is represented in FIG. 2 as a block 28. As is well-known in the art, the circuitry 28 provides signals to the machine to move the tool by a programmed numer of increments of distance from one position to another position. When the tool has reached the commanded position, a transfer signal is sent back to the circuitry 28 indicating completion of that command. The circuitry 28 may also provide signals to a visual readout display 30 which indicates the instruction or command being executed or which indicates the dimension of the inspected point. If desired, these signals may be recorded by a print-out device, such as a recorder 32.

In the numerically controlled machine, the machine program is provided in the form of a code punched onto paper tape. When it is desired to perform a calibrating operation, a particular code indicating that fact is punched into the program tape. This signal activates a gauge mode gate 34. The gauge mode gate 34 then provides an enabling signal which is applied to a permit gauge transfer gate 36. After the gauge mode signal is provided from the program tape to the gauge mode gate, further instructions on the tape cause the tool to move as previously described with reference to FIG. 1. When the tool contacts the surface of the calibration block 18, a signal is sent on the lead 22 to a contact sensor gate 38. This causes a contact signal to be sent along with the enabling signal to the permit gauge transfer gate 36. Coincidence of those two signals causes the permit gauge transfer gate 36 to provide a false transfer signal to the numerical control circuitry 28. In effect, the false transfer signal tells the numerical control circuitry that the tool has executed a given command when, in fact, no command has been executed. However, inasmuch as the exact position of the tool is known in one coordinate at the time the false transfer signal is provided from the permit gauge transfer gate 36 to the numerical control circuitry 28, the program can, in effect, be "re-started" from that particular known position.

The diagram of FIG. 2 also includes an error detector gate 40. The error detector gate 40 serves to provide a signal to deactivation circuitry 42 to deactivate the machine under either of two abnormal conditions, and to provide signals to indicators 44 that visually or audibly indicate a malfunction. At one pair of inputs, the error detector gate 40 receives signals from the gauge mode gate 34 and from the contact sensor gate 38, and will provide an output signal if the tool improperly touches the gauge when the machine is not in its gauge mode of operation. At another pair of inputs, the error detector gate 40 receives signals from the numerical control circuitry 28 and from another output of the gauge mode gate 34. The error detector gate 40 will provide a deactivation signal to the circuitry 42 if, during a gauging mode of operation, a normal transfer signal is provided from the circuitry 28. This condition might occur if the tool being gauged is too short, if the gauge is of improper size, or if there is a program error. In any of these cases the circuitry 42 will deactivate the machine and energize the indicators 44.

Figure 3:
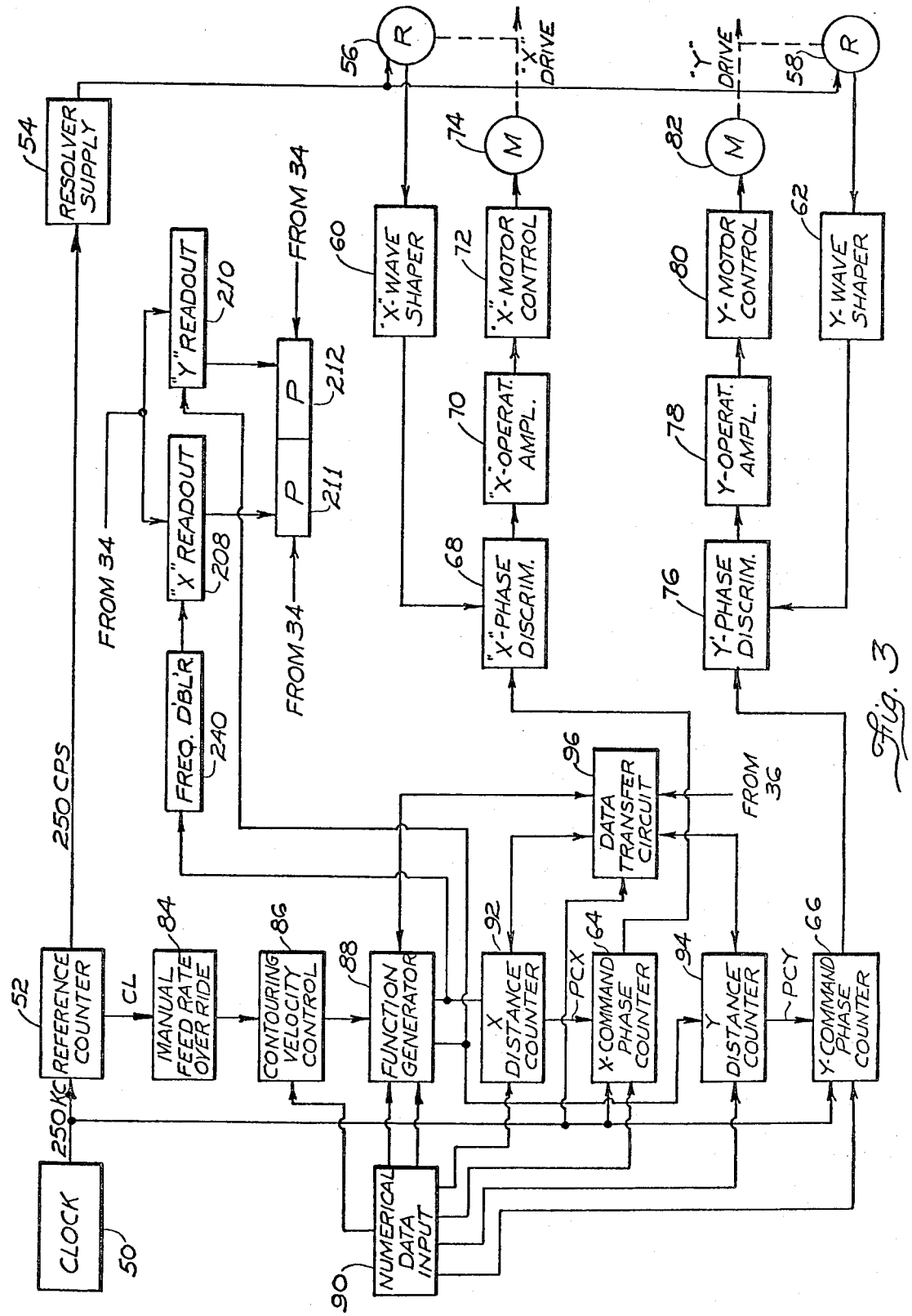
FIG. 3 is a more detailed block diagram of a machine tool to which the invention may be applied.

FIG. 3 is a simplified block diagram of a typical numerical control to which the invention may be applied. Inasmuch as the control shown in FIG. 3 is well-known, it will be described only in such detail as is necessary to enable one to have a full understanding of the present invention.

The basic function of a control system such as that shown in FIG. 3 is to provide continuous coordinated position control of two or more machine motions or axes. For such a control, it is necessary to generate for each of the controlled axes a continuous "position command signal" and to provide a continuous feedback indication "position feedback signal" of the actual machine position.

In the illustrated system, the position command signals and the position feedback signals are both in the form of "phase-analog" voltages. Each phase-analog voltage is a single-phase, alternating-current voltage having a nominal frequency of 250 hertz. Such a voltage conveys position information by means of its phase relationship to a master 250 hertz reference voltage provided in the system. To indicate a change of position, the phase-analog voltage shifts in phase by an amount proportional to the position change.

The operation of the entire system is governed by a square wave, 250 kilohertz clock signal produced by a crystal controlled clock oscillator 50. The 250 kilohertz square wave is provided from the clock oscillator 50 to a reference counter 52, where it is counted down to produce a 250 hertz square wave which serves as the reference voltage for all motions in the system.

To develop the phase-analog voltage which provides the position feedback signal, the 250 hertz reference voltage is provided to a resolver supply 54, which converts the reference voltage to 250 hertz sine and cosine voltages. These serve as a source of two-phase excitation for an X-position resolver 56 and a Y-position resolver 58. When a resolver is excited by a two-phase source, there is induced in its output winding a single-phase sinusoidal voltage, which shifts in phase relative to the reference voltage as a function of the resolver shaft position. The shafts of the resolvers 56, 58 are respectively connected mechanically to the tool whose position is being sensed. Thus, a sinusoidal X-position feedback signal is provided from the resolver 56 to a wave shaper 60, which converts the sinusoidal signal into a square wave having the same phase relationship to the reference voltage as did the sinusoidal wave. A Y-position feedback signal is similarly shaped into a square wave by a wave shaper 62.

The phase-analog voltage which serves as the X-position command signal is produced by feeding the 250 kilohertz output signal of the clock generator 50 to an X-command phase counter 64. In its simplest action, the phase counter 64 counts down the 250 kilohertz signal to produce a 250 hertz square wave output signal much as the reference counter 52 does. A similar phase-analog voltage which serves as the Y-position command signal is produced by a Y-command phase counter 66.

The relative phases of the X-position command signal from the X-command phase generator 64 and the X-position feedback signal from the wave shaper 60 are compared in an X-phase discriminator 68. The discriminator 68 in cooperation with an X-operational amplifier 70 develops a position error signal, whose magnitude and polarity are a function of the relative phase displacement between the two input signals to the discriminator. This X-position error signal causes an X-motor control 72 to drive an X-drive motor 74, which drives the machine and the resolver 56 in a direction to reduce the position error signal and the phase displacement between the two phase discriminator input signals. Similar circuitry for generating a Y-position error signal comprises a Y-phase discriminator 76, a Y-operational amplifier 78, a Y-motor control 80, and a Y-drive motor 82. The Y components function in exactly the same manner as the X components previously described.

The positioning control thus far described would function merely to hold the machine at a fixed position and act to bring it back to that fixed position if it were disturbed. In order to produce controlled motion of the machine, the cycle counting actions of the command phase counters 64, 66 must be modified to cause phase shifts of the position command signals, so that their rate of phase shifts and the total phase shifts are proportional to the desired velocity and total displacement of the controlled motion. For this purpose, the command phase counters 64, 66 are designed to accept second input signals in the form of control pulses. The effect of one control pulse applied to a command phase counter is to modify the normal counting action of the counter momentarily so as to produce a small shift in phase of its output signal. Regular repeated applications of control pulses produce repeated shifts in phase of the position command signals in increments equivalent to 0.0001 inches of machine motion, giving the effect of a continuous phase shift at a rate proportional to the frequency of the applied control pulses. The source of control pulses for the phase counters comprises a manual feed rate override circuit 84, a contouring velocity control 86, and a function generator 88.

The manual feed rate override 84 is driven by a 125 kilohertz square wave input signal provided from an intermediate point within the reference counter 52. This signal is hereinafter called CL. If fed as a stream of pulses directly into the command phase counters 64, 66, it would produce a maximum permissible feed rate for the system. To permit controlling the motion in the system at a feed rate lower than its maximum, the signal CL is not fed directly to the command phase counters 64, 66, but is reduced in frequency by passing it through the manual feed rate override circuitry 84, the contouring velocity control 86, and the function generator 88. Each of these components is capable of reducing the frequency of its incoming train of pulses and supplying to the next component of the system a train of approximately equally spaced pulses occurring at a reduced pulse repetition frequency. By the combined action of those three components, the command phase counters are supplied with streams of control pulses suitable for commanding the desired feed speed.

Input information for the system is provided from a numerical data input circuit 90. Contouring instructions are supplied to the control as blocks of data, each of which specifies a straight line or circular arc path. The data is read from a numerical input medium, such as punched paper tape, by a tape reader and transferred to buffer storage elements included within the various other components of the system. Normally, while the control is processing one block of data, the tape reader starts and quickly reloads the buffers with new information for the following block. Upon completion of the processing of a given block of data the new instructions are transferred from the buffer to the active storage in response to a transfer signal, and computation on the new data block is initiated. Input data is sent from the input circuitry 90 to the contouring velocity control 86, to the function generator 88, to the X-command phase counter 64, to the Y-command phase counter 66, to an X-distance counter 92, and to a Y-distance counter 94.

Referring again to the source of control pulses for the command phase counters, it is pointed out that the basic function of the manual speed rate override circuitry 84 is to provide the machine operator with a manual means of increasing or decreasing the feed rate from the programmed rate. The contouring velocity control 86 is a pulse rate multiplier, which multiplies the pulse rate of its input signal by 1/500th times a decimal numerical command received from the numerical data input circuitry 90.

The function generator 88 is actuated by an incoming pulse train from the contouring velocity control 86 and, under control of data received from the numerical data input circuitry 90, discharges pulses to the X-command phase counter 64 through the X-distance counter 92 and to the Y-command phase counter 66 through the Y-distance counter 94. The function generator 88 performs two basic functions. It is designed to work in a single plane at any one time, and it puts out pulse trains commanding motion along:

a. a straight line of positive slope and any length within the capacity of the generator; or
b. an arc of any length within one quadrant of a specified plane. The function generator output consists of two pulse trains, DF and UF. The pulse frequencies of these trains control the velocities of movement of the tool in the X-direction and Y-direction, respectively, to give the required resultant velocity along the contouring direction. Also, the total numbers of such X or Y-axis pulses control the distance of travel.

The X-axis and Y-axis distance counters 92, 94 respectively measure the displacements of the X and Y-command signals by counting the output pulses received from the function generator. When the total number of counter pulses received from the numerical data input circuitry 90 reaches a commanded number, the distance counters prevent the flow of pulses to their respective command phase counters 64, 66, which indicates that the X and Y counts have been completed. When both distance counters 92, 94 have indicated that the count is complete, a data transfer operation is initiated by a data transfer circuit 96. The data transfer circuit 96 applies a transfer signal TF to operate transfer gates of all buffers and counters to cause a new block of data to be transferred from buffer to active storage, applies a transfer reset signal TRS to the function generator 88 and to the distance counters 92, 94, applies a blocking signal TB to the function generator 88 and to the counters 92, 94 to suspend operation of those units, and applies a buffer reset signal BR to the function generator and the distance counters. The data transfer circuit 96 can also be actuated by receipt of a signal from the permit gauge transfer gate 36 as shown in FIG. 2. It is this latter signal that falsely indicates that the machine has attained a commanded position and is used in the calibrating process, as heretofore described.

Figure 4:
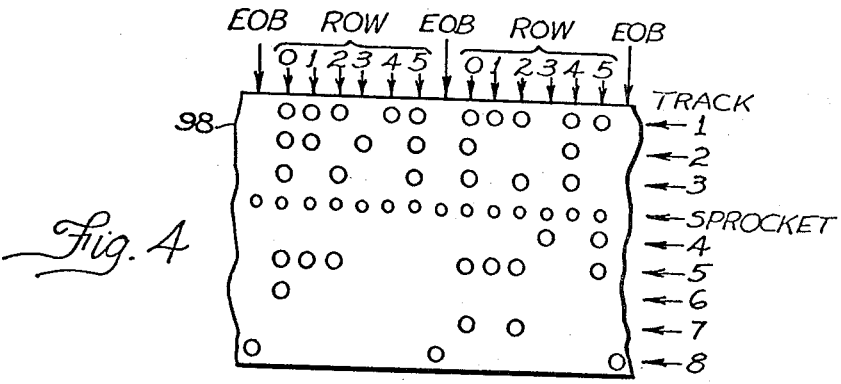
FIG. 4 is a fragmentary view of a punched paper tape for providing numerical input data to the machine tool shown in FIG. 3.

The numerical data input circuitry 90 includes a tape reader and various conventional recognition and decoding circuits. The data input circuitry 90 operates to read coded data from a punched paper tape, such as that shown in FIG. 4, and route the decoded information to the various specified components in the control. A typical paper tape is one inch wide and information is put on the tape by holes punched in longitudinal Tracks 1–8 and transverse Rows 0–5. Each row across the tape represents a character, and the number and position of the holes form a code which identifies the character. In the present example, Tracks 1–4 identify numbers. Track 5 is used for a parity check of conventional type. Tracks 6 and 7 are used in conjunction with Tracks 1–4 to indicate letters. Track 8 is exclusively used for a signal (EOB) indicating the end of an information block. Sprocket holes are punched between Tracks 3 and 4.

Row 0 contains an address letter, and Rows 1–5 contain numbers that indicate a tool position movement from 0–9.9999 inches, in a direction commanded by the letter in Row 0. For example, Rows 0–5 might contain "X35217," which would command the tool to move in the X-direction by 3.5217 inches. This is conventional and well-known in the art. The Rows 1–5 are counted, and signals provided indicating which row after Row 0 is being decoded.

Figure 5:
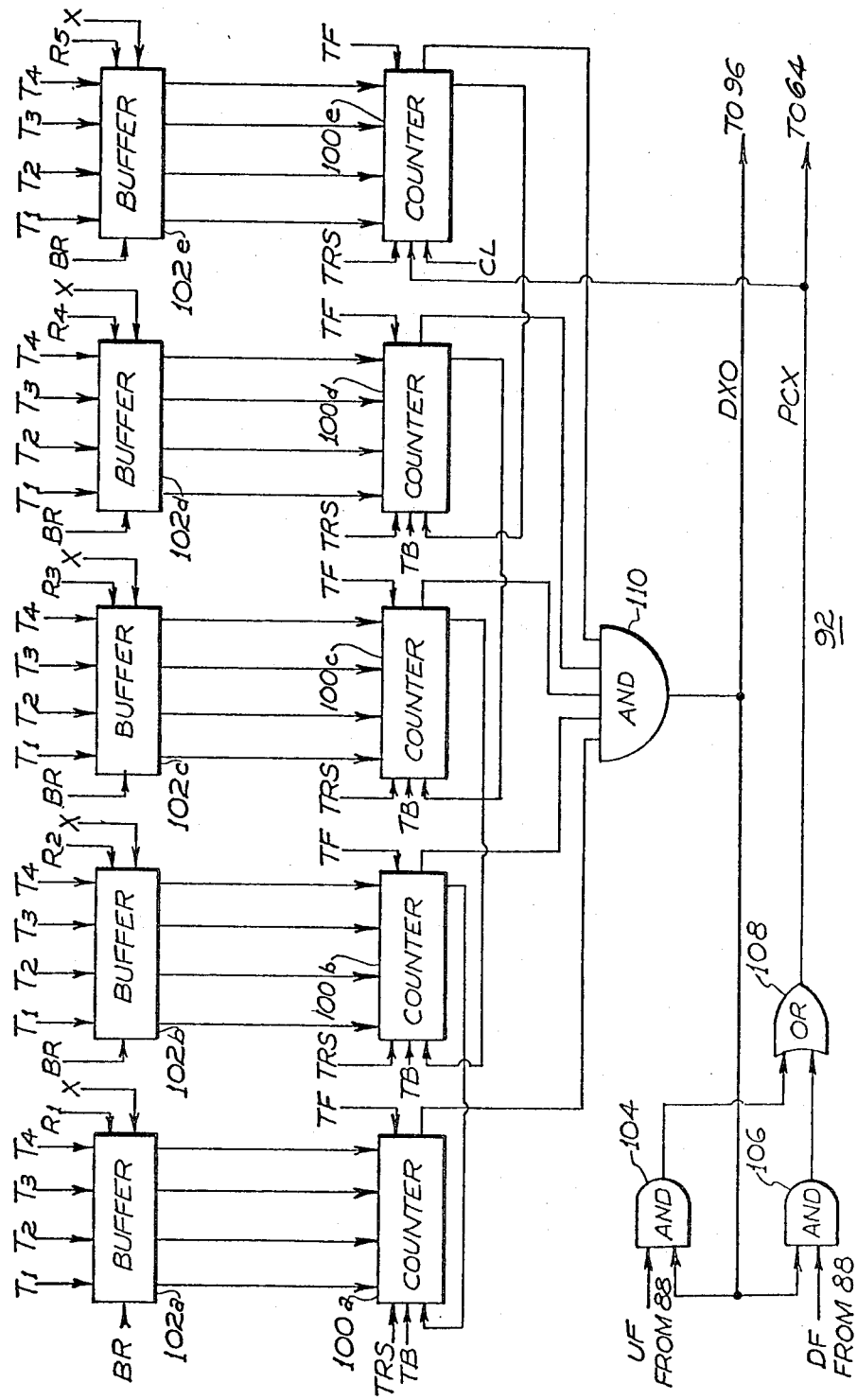
FIG. 5 is a block diagram of a distance counter shown in FIG. 3.

The X-axis distance counter 92 is shown in FIG. 5. The Y-axis distance counter 94 is essentially identical to the X-axis distance counter except for axis nomenclature and input selection signals. Therefore, only one of the two distance counters is shown. As shown, the distance counter is a five-decade decimal counter with associated buffers. It has a capacity of 0 – 99,999 increments equivalent to 0 – 9.9999 inches. In FIG. 5, the five decades of the counter are labeled 100a – 100e, and the corresponding buffers are labeled 102a – 102e. The departure distance command for the axis is read into each decade of the buffers 102 as indicated by signals T1 – T4 from Tracks 1–4, when the X-axis command signal is read from the paper tape. The five buffers 102a – 102e also respectively and sequentially receive signals R1 – R5 from a row counter (not shown) embodied in the numerical data input circuit 90. Thus, as the tape is read, the buffers 102a – 102e are sequentially filled with input data. At the time of completion of a command from a previous block, a transfer signal TF is provided to the counter sections 100a – 100e, which transfers the distance command from the buffers to the corresponding counter sections. The distance counter then counts downwardly from the preset distance count to zero. The least significant figure section 100e of the counter receives clock pulses CL. The decades of the counter are so connected together that for each count down of ten in one decade a single pulse is applied to the next more significant figure decade to cause it to count down by one unit. Each decade 100a – 100e of the counter also receives transfer reset signals TRS and transfer blocking signals TB from the data transfer circuit 96. Each buffer 102a – 102e also receives a buffer reset signal BR from the data transfer circuit.

The distance counter also includes input selection gates comprising two AND gates 104, 106 and an OR gate 108. The AND gate 104 receives a train of signals UF from the function generator 88, and the AND gate 106 receives a train of signals DF from the function generator 88. One or the other signals UF, DF will be provided depending on the direction of motion that is being commanded. A second input to each of the AND gates 104, 106 is received from the output of an AND gate 110. The AND gate 110 has five inputs which are respectively connected to outputs of the counter decades 100a – 100e. When the counter has counted down to zero, the AND gate 110 is enabled. This provides an output signal DXO to the data transfer circuit 96, which signal also blocks the AND gates 104, 106. Before the counter has counted down to zero, one or the other of the AND gates 104, 106 will be enabled and a contouring increment signal PCX will be passed by the OR gate 108 and provided to the X-command phase counter 64. That signal is also provided to a steering input of the first decade 100e of the distance counter to simultaneously produce a decrease of one count in the counter and a phase shift of one increment in the command phase counter, when the next following clock pulse CL is received.

Figure 6:
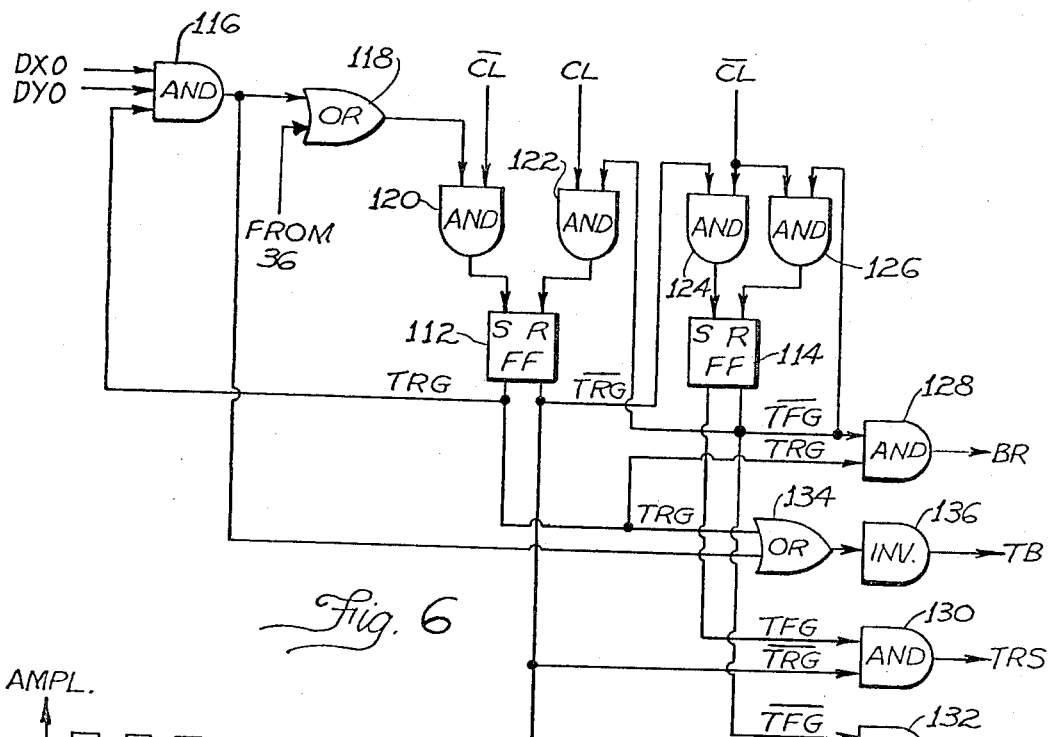
FIG. 6 is a logic diagram of a data transfer circuit shown in FIG. 3.

FIG. 6 is a logic diagram of the data transfer circuit 96 shown in block diagram form in FIG. 3. Basically, it comprises a transfer reset flip-flop 112 and a transfer flip-flop 114, with various input and output gates. The transfer of data from buffer storage to active command is normally initiated as soon as both axis distance counters 92, 94 have reached zero, indicating the completion of motion on a given block of data. However, that transfer of data can also be initiated in accordance with the present invention by providing a false signal to the data transfer circuit, which falsely indicates a completion of motion on a given block of data.

Figure 7:
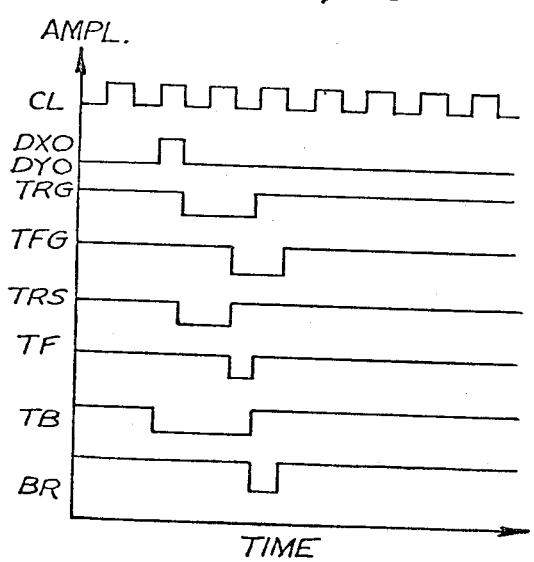
FIG. 7 is a timing diagram relating to the signals produced by the data transfer circuit shown in FIG. 6.

The transfer of data entails four operations. The operations are, in the order of occurrence, transfer blocking (TB signal), transfer reset (TRS signal), transfer (TF signal), and buffer reset (BR). These signals bear a synchronous relationship to the clock signal CL, and are connected to the data storage locations to produce a coordinated, parallel transfer of data. The time relationship of those signals is shown in FIG. 7.

The transfer blocking signal TB suspends operation of the function generator 88. It also turns off the count gates of all but the least significant decade 102e of the distance counters 92, 94 in order to prevent a progressive triggering from one decade to the next during the transfer reset operation.

The transfer reset signal TRS resets both distance counters 92, 94 in preparation for the next operation.

The transfer signal TF operates the transfer gates on all active command buffers and counters to bring the flip-flops in both counters 92, 94 into agreement with the states of the corresponding flip-flops in their buffers, and thereby effect the actual transfer of data.

The buffer reset signal BR resets the buffers in the distance counters 92, 94 so that programmed distances are wiped out after once being used. Buffer values for new distances are then zero until new values are read in.

Input to the data transfer circuit is through an AND gate 116. The AND gate 116 receives DXO and DYO signals from the distance counters 92, 94, respectively, and a steering signal from the reset flip-flop 112. Output of the AND gate 116 is to one input of an OR gate 118. A second input of the OR gate 118 is connected to receive the output from the permit gauge transfer gate 36 shown in FIG. 2. The output of the OR gate 118 is connected to one input of an AND gate 120, and a second input of the AND gate 120 receives inverted clock pulses $\overline{CL}$. An output of the AND gate 120 is connected to a set input terminal of the reset flip-flop 112. The output of the OR gate 118 provides set steering for the reset flip-flop 112. The flip-flop 112 is reset by an output signal from an AND gate 122. One input of the AND gate 122 receives clock pulses CL, and a second input of that AND gate receives a steering signal from the output of the transfer flip-flop 114.

The transfer flip-flop 114 receives a set input signal from an output of an AND gate 124. One input of the AND gate 124 receives a signal from the reset flip-flop 112, and a second input of that and gate receives inverted clock signals $\overline{CL}$. The signal from the reset flip-flop 112 provides steering for setting the transfer flip-flop 114. A reset input of the transfer flip-flop 114 is connected to an output of an AND gate 126. One input of the AND gate 126 is connected to receive inverted clock pulses $\overline{CL}$, and a second input of that gate is connected to receive an output signal from the transfer flip-flop 114. The signal from the flip-flop 114 provides reset steering for that same gate.

The output gates of the data transfer circuit comprise three AND gates 128, 130, 132 and an OR gate 134 followed by an inverter 136. The AND gate 128 is connected to receive TRG and $\overline{TFG}$ signals from the reset flip-flop 112 and the transfer flip-flop 114, respectively, and provides the signal BR. The AND gate 130 likewise receives signals from those two flip-flops, but the signals are of opposite polarity ($\overline{TRG}$ and TFG) to those supplied to the AND gate 128, and provides the signal TRS. The AND gate 132 also receives input signals from those two flip-flops, but the signals have different polarity relationships ($\overline{TRG}$ and $\overline{TFG}$) than those supplied to the other two AND gates, and provides the signal TF. The OR gate 134 receives signals (TRG) from the reset flip-flop 112 and signals from the output of the input AND gate 116. The output signal of the OR gate 134 is merely inverted by the inverter 136 to provide the signal TB.

In the operation of the data transfer circuit, the reset flip-flop 112 and the transfer flip-flop 114 are initially both in reset states. When the DXO and DYO input signals to the AND gate 116 go to logic "0," indicating that the distance counters 92, 94 have counted down to zero, an output signal from the AND gate 116 causes the transfer blocking signal TB to go to logic "1." This action also causes the reset flip-flop 112 to be set steered.

The next incoming $\overline{CL}$ signal through the gate 120 sets the flip-flop 112. Thus, its output signal TRG goes to logic "1" and acts through the gates 134, 136 to hold the output signal TB at logic "1." Since the reset flip-flop 112 is set and the transfer flip-flop 114 is reset, their output signals act through the AND gate 130 to cause the signal TRS to go to logic "1." This resets all of the flip-flops in the distance counters 92, 94 which causes the signals DXO and DYO to go to logic "1" and removes the set steering signal from the reset flip-flop 112.

The next incoming $\overline{CL}$ pulse sets the transfer flip-flop 114, since the signal TRG is at a logic zero and provides the proper steering. The signal TRS then goes to logic "0," since that signal can be at logic "1" only while the reset flip-flop 112 is set and the transfer flip-flop 114 is reset. Simultaneously, the signal TF goes to logic "1," since it can be at logic "1" only when both flip-flops 112, 114 are set.

The next clock pulse CL resets the reset flip-flop 112. The flip-flop 112 was steered to reset when the flip-flop 114 was set. Therefore, the output signal TF goes to logic "0" and the output signal BR goes to logic "1."

The next clock pulse $\overline{CL}$ resets the flip-flop 112, thus causing the signal BR to go to logic "0." The output signals TRS, TF, and TB have previously gone to logic "0." The flip-flops 112, 114 are both reset and the transfer cycle is completed.

In accordance with the present invention, the same data transfer action is initiated by providing a logic "1" signal to the OR gate 118 from the permit gauge transfer gate 36 (FIG. 2), when the gauger of the invention is made operative.

Figure 8:
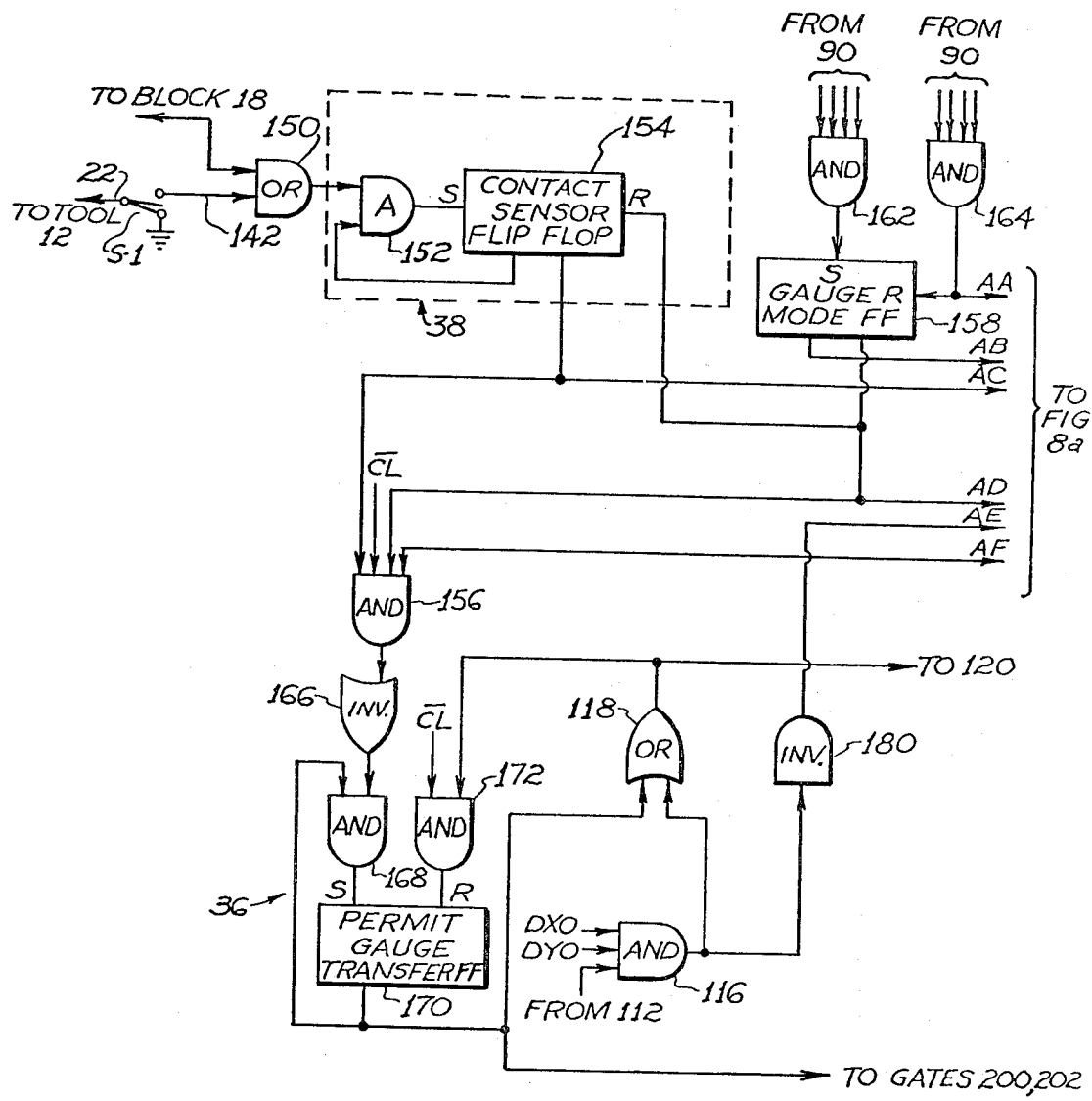

FIGS. 8 and 8a are logic diagrams of exemplary circuitry embodying the invention and showing the interconnections with the other portions of the control circuitry. Those sections of the circuitry shown in FIGS. 8 and 8a which are also shown in FIG. 2 are identified in FIGS. 8 and 8a generally by the same reference numerals as are used in FIG. 2.

As illustrated in FIG. 8, the tool 12 is connected through lead 22 to the movable contact of a single-pole, double-throw mode switch S–1. One of the other terminals of switch S–1 is coupled to ground and the other contact is connected to one of the input terminals 142 of an OR gate 150. The OR gate 150 is connected to one input of an AND gate 152. An output of the AND gate 152 is connected to a set input terminal of a contact sensor flip-flop 154. An output of the flip-flop 154 is connected to a second input of the AND gate 152 to provide a set steering signal to the AND gate.

An output of the contact sensor flip-flop 154 is connected to one input of a four-input AND gate 156. The other three inputs of the AND gate 156 are respectively connected to receive clock pulses $\overline{CL}$, an output signal from a gauge mode flip-flop 158, and an output signal from an error detector flip-flop 160.

The gauge mode flip-flop 158 controls the time at which and during which a calibrating operation is performed. In turn, operation of the gauge mode flip-flop 158 is controlled by output signals from two AND gates 162, 164. The AND gate 162 has four inputs which are connected to receive signals from the data input circuitry 90 and an output connected to a set input terminal of the flip-flop 158. The AND gate 164 likewise has four inputs connected to receive signals from the data input circuitry 90 and an output connected to a reset input terminal of the flip-flop 158. The same output terminal of the gauge mode flip-flop 158 that is connected to an input terminal at the AND gate 156 is also connected to provide a reset signal to a reset input terminal of the contact sensor flip-flop 154.

The AND gate 156 previously mentioned has its output connected to one input of an inverter 166. The inverter 166 inverts the output signal from the AND gate 156 and provides it to one input of an AND gate 168. An output of the AND gate 168 is applied to a set input terminal of a permit gauge transfer flip-flop 170. An output of the permit gauge transfer flip-flop 170 is connected to a second input of the AND gate 168 to provide a set input steering signal for the AND gate. The output of the permit gauge transfer flip-flop 170 is also connected as one input to the OR gate 118 previously described in connection with FIG. 6. A second input to the OR gate 118 is also provided from the AND gate 116 previously described with reference to that same figure. Thus, the OR gate 118 provides an output signal to the AND gate 120 in the data transfer circuitry in response to receiving either a normal transfer signal from the AND gate 116 or a false transfer signal from the permit gauge transfer flip-flop 170.

The output of the OR gate 118 is also connected to one input of an AND gate 172. An output of the AND gate 172 is connected to a reset input terminal of the permit gauge transfer flip-flop 170. A second input of the AND gate 172 is connected to receive clock signals CL. The signal from the OR gate 118 to the AND gate 172 provides a reset steering signal for that AND gate.

The error detection portion of the circuitry includes the error detector flip-flop 160 previously mentioned, which receives a set input signal from an OR gate 174. The OR gate 174 has two inputs which respectively receive signals from AND gates 176, 178.

The AND gate 176 has two inputs, one of which is connected to receive a signal from the gauge mode flip-flop 158 and the other of which is connected to receive a signal from the AND gate 116 through an inverter 180. The AND gate 178 also has two inputs, one of which is connected to receive a signal from the contact sensor flip-flop 154 and the other of which is connected to receive a signal from an inverter 182. In turn, the inverter 182 receives and inverts a signal from an AND gate 184. The AND gate 184 has two inputs, one of which is connected to receive a signal from the gauge mode flip-flop 158 and the other of which is connected to receive clock signals CL.

The output signal of the error detector flip-flop 160 is supplied through an inverter 186 to deactivation circuitry 188. The deactivation circuitry 188 serves to immobilize the machine in response to an error signal from the detector flip-flop 160. It may also serve to energize one or more alarms or annunciators 190 of any desired type to provide a visible or audible indication of machine malfunction.

In normal operation, signals are provided through the AND gate 116 and the OR gate 118 to initiate a data transfer operation in the data transfer circuit 96. This has been previously explained in connection with FIGS. 6 and 7. When in the calibration mode of operation, a false signal is provided through the OR gate 118 which actuates the data transfer circuit in precisely the same manner as a normal signal provided through the AND gate 116. Calibrating operation is initiated by receipt of gauge mode command signals from the data input circuitry 90 by the AND gate 162. The output signal of the gauge mode flip-flop 158 causes the contact sensor flip-flop 154 to be reset if it has not been previously reset.

The machine is now commanded to move toward the calibration block 18. When the tool 12 contacts the block 18, the block 18 is brought to ground potential through the tool 12 and switch S-1. Since the block 18 is connected to one of the input terminals of OR gate 150, that input terminal is brought to ground potential. When this input terminal is grounded, a binary "0" signal is applied to AND gate 152. Then, a signal is supplied from the AND gate 152 to the contact sensor 154 to set that flip-flop. This signal, in turn, provides a logic "0" signal to one input of the AND gate 156. The mode flip-flop 158 having been set is also providing a logic "0" signal to another input of the AND gate 156. In the event that there is no system error, the error detector flip-flop 160 is also providing a logic "0" signal to the AND gate 156. Therefore, when next a logic "0" clock pulse CL appears, the AND gate 156 will provide a logic "1" output signal to the inverter 166. The OR gate inverts that signal and thus provides a logic "0" signal to one input of the AND gate 168. If the permit gauge transfer flip-flop 170 is in its reset condition, it also is providing a logic "0" signal to the AND gate 168. Thus, the AND gate 168 will provide a logic "1" signal to set the gauge transfer flip-flop 170. This causes the gauge transfer flip-flop 170 to provide a logic "1" signal to the OR gate 118. The OR gate 118 inverts this signal and provides it as a logic "0" signal to the AND gate 120 in the data transfer circuit.

The OR gate 118 also provides a logic "0" signal to one input of the AND gate 172. Thus, upon receipt of the next logic "0" clock pulse CL, the AND gate 172 will cause the permit gauge transfer flip-flop 170 to be reset.

The contact sensor flip-flop 154 is reset after the calibrating operation either by the start of a second calibrating operation or by the provision of a normal transfer signal from the AND gate 116. The first condition is shown by the connection from the gauge mode flip-flop to the reset terminal of the contact sensor flip-flop 154, while connections for the latter resetting operation are not shown.

The gauge mode flip-flop 158 is reset by receipt of signals at the AND gate 164 from the data input circuitry 90 indicating the start of a normal programming operation.

The error detection portion of the circuitry causes deactivation of the machine under two conditions. These conditions are met by the tool touching the calibration block when the gauger is not in the calibration mode of operation, or if when in the calibration mode of operation, a normal transfer signal is provided.

The detection of the former abnormality involves the AND gate 184, the inverter 182, and the AND gate 178. If the equipment is not in the calibration mode of operation, a logic "0" will be provided at one input of the AND gate 184 from the gauge mode flip-flop 158. Therefore, at the occurrence of the next logic "0" clock pulse CL, a signal will be sent through the inverter 182 and will appear as a logic "0" signal at one input to the AND gate 178. If the tool touches the calibration block, it will cause a logic "0" signal to appear at the output of the contact sensor flip-flop 154. This signal is also supplied to the AND gate 178 so that the AND gate 178 will supply a signal through the OR gate 174 to set the error detector flip-flop 160. When the error detector flip-flop 160 is set, it provides a logic "1" signal to an input of the AND gate 156, so that the gauger is inoperative. Of course, the error detector flip-flop 160 also provides a signal through the inverter 186 to the deactivation circuitry 188 to suspend operation of the machine.

If the latter abnormality occurs, it is detected by the AND gate 176. When operating in the calibrating mode, the gauge mode flip-flop 158 provides a logic "0" signal to an input of the AND gate 176. If now a normal transfer should occur, the AND gate 116 will provide a logic "1" output signal. That signal is inverted by the inverter 180 and supplied as a logic "0" signal to the second input of the gate 176. This causes a signal to be supplied from that AND gate through the OR gate 174 to set the error detector flip-flip 160 and suspend operations as previously described.

Resetting of the error detector flip-flop 160 is accomplished by a manual control (not shown). This insures that the machine malfunction is brought to the attention of an operator and the condition corrected before operation is resumed.

GAUGING MODE OF OPERATION

Having now described the calibration mode of operation which is applicable to the calibration of a machine tool, such as a cutting tool, as well as to an inspection probe, the operation of the gauging mode will now be described. Thus, the description which follows is directed toward the gauging of the dimensions of a workpiece after the workpiece has been partially or completely machined.

During the gauging mode of operation, tool 12 takes the form of an inspection probe. The inspection probe may be commanded to move to various inspection points on the workpiece or ring 10 in order to gauge the dimensions of the inspection points. The mode switch S-1 is left in the position as shown in FIG. 8, and the inspection probe is calibrated in the same manner as was described with respect to the tool 12. In other words, each of the steps which were carried out to calibrate the tool 12 is performed again with the inspection probe in order to precisely calibrate the position of the probe. This calibration procedure is necessitated by the same factors which necessitate calibrating the machine tool, i.e., misalignment of the tool, wear on the edge of the tool, etc.

Reference is again made to FIGS. 8 and 8a which also include circuitry for carrying out the function of gauging a workpiece. More particularly, the conductor which connects the permit gauge transfer flip-flop 170 to the OR gate 118, is also connected to the inputs of a pair of AND gates 200, 202. The output terminals of the AND gates 200, 202 are respectively coupled through a pair of pre-set circuits 204, 206 to a pair of readout devices 208, 210. The readout device 208 provides an X-axis readout indication and is in turn coupled to an X-axis printer 211, and the readout device 210 provides a Y-axis readout indication and is in turn coupled to a Y-axis printer 212.

A pair of four-input AND gates 214, 216 have their input terminals connected to the numerical data input circuit 90 and their output terminals respectively coupled to the set terminals of a Y-axis inspection flip-flop 218 and an X-axis inspection flip-flop 220. The reset terminals of flip-flops 218, 220 are connected directly to the output terminals of the AND gate 164. In addition, the output terminal of Y-axis inspection flip-flop 218 is connected to one of the input terminals of an AND gate 222 and one of the input terminals of a NAND gate 224. Similarly, the output terminal of X-axis inspection flip-flop 220 is connected to one of the input terminals of an AND gate 226 and one of the input terminals of a NAND gate 228. The other input terminals of AND gates 222, 226 are connected in common to the commonly connected input terminals of the AND gates 220, 202, and the other input terminals of NAND gates 224, 228 are connected in common to the conductor which extends between the gauge mode flip-flop 158 and the AND gate 176.

The output terminals of AND gates 222, 226 are respectively coupled to the Y-axis printer 212 and X-axis printer 211. The output terminals of NAND gates 224, 228 are respectively connected to the other input terminals of AND gates 202, 200, and the function generator 88 is connected to both the X-axis readout device 208 and the Y-axis readout device 210.

Another pair of four input AND gates 230, 232, have their input terminals connected to the numerical data input circuit 90 and their output terminals respectively connected to a Y-axis polarity flip-flop 234 and an X-axis polarity flip-flop 236. The output terminals of the X-polarity flip-flop 236 are connected to the X-readout device 208 and the output terminals of the Y polarity flip-flop 234 are connected to the Y-axis readout device 210.

Once the inspection probe has been calibrated as previously described, the mode switch S-1 is moved from the position as shown in FIG. 8 to a position in which the tool or probe 12 is connected to the input terminal 142 of the OR gate 150. The probe is then commanded to move toward the workpiece or ring 10 and toward a preselected point on the ring at which the dimension is to be measured. The command signal is somewhat similar to the command signal given to the tool 12 during the calibrate cycle, i.e., the tool is commanded to move to a position beyond the point to be inspected on the ring 10. This point would actually be within the ring 10.

Thus, the signals which are generated by the function generator 88 are applied to the X-axis readout device 208 and Y-axis readout device 210. The X-axis signal is applied through a frequency doubler circuit 240 so that when a cylindrical part is measured, the radial distance may be doubled in order to provide an output display representative of the diameter measurement.

Accordingly, in the gauging mode, a particular program is coded on the tape. The tape program commands the probe to move to a position which would theoretically require the probe to move past the surface of the workpiece or ring 10. Upon electrical contact being made between the probe and the ring 10, a logical "1" signal is applied to the OR gate 150. This signal causes the data in the counters to go to a zero count, which in turn, causes a transfer signal to be generated indicating to the system that the commanded position has been reached. This transfer signal, or "false" signal, which is generated when the probe reaches a "false" position, actuates the control system to move into the next sequence of the program.

The X-axis readout device 208 and Y-axis readout device 210 are calibrated in inches and are controlled by the function generator 88 to count down for each incremental move of the probe to thereby maintain a continuous readout of the probe position. The X-axis printer 211 and Y-axis printer 212 are responsive to the contact between the probe and the ring 10 to thereby cause the information representative of a characteristic of position such as dimensional information, out-of-tolerance information, et cetera to be printed only upon contact by the probe (not shown).

It is now apparent that the method and apparatus of the invention attain the general objective set forth. Among the apparent advantages inherent in the use of this invention are the elimination of inspection time due to more accurate machining, a reduction in the time required for producing a machined part, and a reduction in the time required to gauge a machined part.

Although one embodiment of the invention has been described and illustrated, it is apparent to one skilled in the art that various changes and modifications may be made without departing from the spirit and scope of the invention.

I claim:

1. A method of gauging the dimensions of a workpiece with an inspection probe in a numerically-controlled machine tool in which a transfer signal is developed when the inspection probe has reached a commanded position, including the steps of:
    a. moving the inspection probe toward a predetermined commanded position within a said workpiece;
    b. developing a false electrical transfer signal when the probe contacts a surface of a said workpiece; and,
    c. providing an output indication of a characteristic of position of the inspection probe relative to a reference position of said probe in response to said false transfer signal.

2. A method of gauging as defined in claim 1 including the step of moving the inspection probe to a new commanded position in response to the receipt of a said false electrical transfer signal.

3. A method of gauging the dimensions of a workpiece with an inspection probe comprising the steps of:
    a. moving the inspection probe toward a predetermined commanded, but unattainable, position beyond a calibration position;
    b. developing an electrical signal when the probe reaches said calibration position in the course of moving toward said commanded position;
    c. moving the inspection probe toward a second predetermined commanded, but unattainable, position within a said workpiece;
    d. developing a second electrical signal when the probe contacts a surface of a said workpiece; and,
    e. providing an output indication of the position of the inspection probe referenced to said calibration position in response to said second electrical signal.

4. A method of gauging as defined in claim 3 including the step of moving the inspection probe to a third commanded position in response to said second electrical signal which is developed when the probe contacts a surface of a said workpiece.

5. A method of gauging the dimensions of a workpiece in a numerically-controlled machine tool with an inspection probe in which an electrical transfer signal indicates that the probe has reached a commanded position, and comprising the steps of:
    a. providing a gauge having a surface whose position in one of said coordinates is known;
    b. positioning said probe adjacent said surface;
    c. moving said probe along one of said coordinates toward said surface to a commanded, but unattainable, position beyond said surface;
    d. causing a false electrical transfer signal to be provided when an operative portion of said probe contacts said surface;
    e. moving said probe away from said surface in response to said false transfer signal;
    f. moving said probe toward a second commanded position within a said workpiece;
    g. developing a second false electrical transfer signal when said probe contacts a surface of a said workpiece; and,
    h. providing an output indication of the position of the inspection probe referenced to said first commanded position in response to said second false transfer signal.

6. Apparatus for gauging the dimensions of a workpiece in a numerically controlled machine tool with an inspection probe in which an electrical transfer signal indicates that the probe has reached a predetermined commanded position and comprising:
    a. drive means fixed relative to said work piece for moving said probe;
    b. programmable control means for directing said drive means to move said probe along a predetermined path toward a predetermined commanded position past a surface of a workpiece;
    c. circuit means electrically connected with said work piece and said probe for providing a false electrical transfer signal when the probe contacts a surface of a said workpiece in the course of moving toward the commanded position
    said circuit means further including means providing an output indication of a characteristic of the position of the inspection probe relative to a reference position of said probe in response to the receipt of said false electrical transfer signal.

7. An apparatus as defined in claim 6 including control means for actuating said drive means in response to said false transfer signal to move said probe away from a said surface of a said workpiece toward a new predetermined commanded position.

8. Apparatus for gauging the dimensions of a workpiece in a numerically-controlled machine tool in which an electrical transfer signal indicates that an inspection probe has reached a commanded position, comprising:
   a. a gauge block and means for maintaining a surface of the block in a preselected position in terms of known tool position coordinates with respect to such workpiece;
   b. drive means fixed relative to said work piece for moving said probe;
   c. programmable control means for directing said drive means to move said probe along one of said coordinates toward a predetermined commanded position past said surface;
   d. electrical means in circuit with said gauge block and said probe for providing a false electrical transfer signal when an operative portion of said probe contacts said surface of said gauge block;
   e. control means for actuating said drive means in response to said false transfer signal to move said probe away from said surface and toward a new commanded position within a said workpiece;
   f. circuit means in circuit with said probe for developing a second false electrical transfer signal when the probe contacts a surface of a said workpiece; and,
   g. readout means for developing an output indication of a characteristic of the position of the inspection probe relative to the gauge block in response to said second false transfer signal.

* * * * *